United States Patent [19]

Snow, Jr.

[11] 4,433,571
[45] Feb. 28, 1984

[54] NON-CONTACTING GAGE TIP PAD

[75] Inventor: Ralph K. Snow, Jr., Medford Lakes, N.J.

[73] Assignee: Schaevitz Engineering, Pennsauken, N.J.

[21] Appl. No.: 213,943

[22] Filed: Dec. 8, 1980

[51] Int. Cl.³ .............................................. G01B 13/06
[52] U.S. Cl. ........................................ 73/37.5; 73/37.7
[58] Field of Search .................... 73/37.7, 37.6, 37.5; 33/DIG. 2; 188/322.13

[56] References Cited

U.S. PATENT DOCUMENTS

| | | | |
|---|---|---|---|
| 3,367,455 | 2/1968 | Panigati | 188/322.13 |
| 3,610,024 | 10/1971 | Honjo et al. | 73/37.5 |
| 4,106,330 | 8/1978 | Hinrichs | 73/37.7 |
| 4,292,838 | 10/1981 | Larsen | 73/37.7 |

FOREIGN PATENT DOCUMENTS 286242  1/1971  U.S.S.R. .............................. 73/37.5

Primary Examiner—Gerald Goldberg
Assistant Examiner—Joseph W. Roskos
Attorney, Agent, or Firm—John F. A. Earley

[57] ABSTRACT

An air-bearing gage tip or pad for a gage head is mounted on a swivel and closely follows the surface of a non-porous material without touching the surface and accommodates undulating surfaces which approach the pad at an angle and also small errors in mounting the pad normal to the surface, and additionally accepts small imperfect, surface perturbations without loss of air. The air-bearing pad features advantages in respect of increase in bearing stiffness and increase in mechanical response of the gage head and improvement in freedom from adverse effects encountered in the prior art and tending to be caused by thermal shifts and inherent hysteresis.

5 Claims, 6 Drawing Figures

NON-CONTACTING GAGE TIP PAD

TECHNICAL FIELD

This invention relates to an improvement in gage heads, and more particularly, to wear-resistant, non-contacting gage tips or pads that are useful for precise position or thickness measurements of non-porous, rapidly moving, relatively smooth, material surfaces.

DESCRIPTION OF THE PRIOR ART

Many proposals have been made in the prior art for measuring or gaging various materials or objects including moving non-porous, relatively smooth surface materials such as paper, rubber, sheet steel, plastic, thin film deposits, press-board and the like. Contacting and non-contacting gage heads have been proposed.

A contacting gage head that is widely used in machine tool inspection and gaging equipment is the displacement transducer that is illustrated in FIG. 1 of the drawings herein. This gage head is manufactured by Schaevitz Engineering, Route 103 and Union Avenue, Pennsauken, N.J., the assignee of the present invention. This gage head, disclosed in Schaevitz technical bulletin, 1504, includes a probe having a contact point or tip that is made from hardened steel and is provided with a chrome-plated, tungsten carbide, sapphire or diamond face. The gage head employs a linear variable differential transformer (LVDT) and a spring which loads and maintains the contact point in contact with the surface being gaged. The LVDT measures the contact point displacement and converts this movement into an electrical signal that is directly proportional to the displacement.

Displacement transducers employing such contact points or tips have limited utility, however, in that the tips can mar or tear fragile material. Moreover, the tips themselves are subject to wear as the surfaces contacted sometimes move at speeds from 60 to 600 feet per minute. Contacting surfaces moving at such speeds would result in excessive wear of the tip within a relatively short time. It is known, for example, that a carbide tip sliding against paper can wear several thousandths of an inch per day.

Contacting roller-type tips have been proposed but also have been found to be unsatisfactory in that a small roller bearing is required to run many thousand revolutions per minute and can exceed its rotational life within a few weeks.

Non-contacting material surface gaging sensors that have been proposed in the prior art include such devices as proximity, optical, capacitance and beta gage devices. All of such devices also are subject to serious limitations. Proximity devices have very limited range and work only on ferrous or conductive materials; optical devices require reflective surfaces for operation; capacitance devices are affected by humidity; and beta gage devices work only on material with constant density, being susceptible to changes in the density of the material even though the thinness remains the same.

A number of fluid operated or pneumatic type non-contacting position or thickness sensors have also been proposed in the prior art. One such non-contacting gage, which gage head also is manufactured by Schaevitz Engineering and is disclosed in Scaevitz technical bulletin 1505, permits non-contacting accurate measurements of thickness variations of any non-porous material, from smooth and flat to rough machined with no limitations on the range of measurement. This non-contacting gage head comprises an LVDT and a pneumatic sensing mechanism which maintains a constant space between a nozzle follower having a sensing orifice and the surface of the material the thickness of which is being measured. The LVDT measures the nozzle displacement as it tracks the material surface profile and converts this movement into an electrical signal that is directly proportional to thickness of the material.

Other forms of non-contacting pneumatic type devices are disclosed in U.S. Pat. Nos. 3,968,679, 3,885,417, 3,850,024, 3,496,744, 3,439,536 and 3,244,864.

U.S. Pat. 3,968,679 discloses a pneumatic sensor head that is comprised of first and second blocks having respective first and second aligned nozzles that are separated by a distance that is just sufficient to receive in non-contacting manner, a sheet of material the thickness of which is to be measured. Pressurized fluid is applied to the first and second nozzles, an average variation in back pressure therefrom being proportional to a change in thickness of the material. A specified number of stacked laminated sheets are selectively positioned between the first and second blocks for adjusting the distance between the first and second nozzles to extend the range of measurement and thereby enable operation of the sensor head with sheets of material having different nominal thickness.

U.S. Pat. No. 3,885,417 discloses a fluidic gauging sensor head for monitoring a characteristic such as the diameter, density or porosity of strand like material such as yarn or wire.

U.S. Pat. No. 3,850,024 discloses an apparatus for sensing flatness or shape of a metal strip comprising a plurality of air nozzles that are spaced away from and constantly out of contact with the lower side of a suspended moving resilient metal strip. A similar apparatus for sensing and controlling the flatness of the shape of the strip is disclosed in U.S. Pat. No. 3,496,744 wherein the air nozzles are placed above a suspended metal strip. In each patent high velocity jets of air are blown from a number of nozzles that are spaced transversely of the moving strip for measuring the distribution of tension along the width of the strip.

U.S. Pat. No. 3,439,536 discloses a cylindrical porous "air bearing" for measuring the tension of a moving strip or tape, the bearing embracing the full width of the strip.

U.S. Pat. No. 2,244,864 discloses a sensor for sensing and controlling the moisture content of a web by sensing variations in the position of an edge of or in the width of the web, the sensor comprising a small tube placed transversely of the web and within which a developed pressure is permitted to excape through a narrow slit facing the web for its full width.

The foregoing prior art gages are all subject to one or more of the following disadvantages that limit their field of application, their speed of response, their stability, and/or their manufacturing cost:

1. The air exiting the nozzle is a small high velocity column or jet which can deform soft surfaces, for example paint and thin plastic film;
2. Due to orifices used to create a back pressure in the rear chamber the response of the unit is extremely low, approximately 1-5 cycles per second;
3. The gages are extremely large and bulky;
4. Aluminum used in construction of the LVDT gage head undergoes large thermal shifts in "zero" as the air is turned on and starts cooling the cylinder of the pneumatic servo mechanism.

5. Due to friction of seals that are provided the gage head has an inherent hysteresis of 0.0001" (0.000254 cm.).

6. The small target size of the nozzle stream, 0.060 (0.1524 cm.), is susceptible to small perturbations or cracks in the surface of the material being gaged.

SUMMARY OF THE INVENTION

An object of the invention is to provide an improvement in wear-resistant, non-contacting gage tips or pads that are applicable to gage heads and that overcome the aforementioned problems encountered in the prior art in gaging rapidly moving, relatively smooth, material surfaces.

A further object of the invention is to provide an improved gage tip or pad that makes any gage head non-contacting and at much higher speeds of response.

In accomplishing this and other objectives of the present invention, there is provided a novel air-bearing device having a short cylindrical pad and a swivel mount, with an integral air fitting, that is readily attachable to existing prior art gage heads including that illustrated in FIG. 1.

The air-bearing pad of the present invention is characterized by its inclusion of a low friction, tight fitting swivel that is effective to accommodate material surfaces that approach the pad at an angle and/or to accommodate small errors in mounting the pad normal to the surface of the material being gaged. The swivel, additionally accepts small, imperfect, surface perturbations without "spilling" or loss of air and the associated change in air gap.

DETAILED DESCRIPTION OF THE PREFERRED EMBODIMENTS

Figure 1:
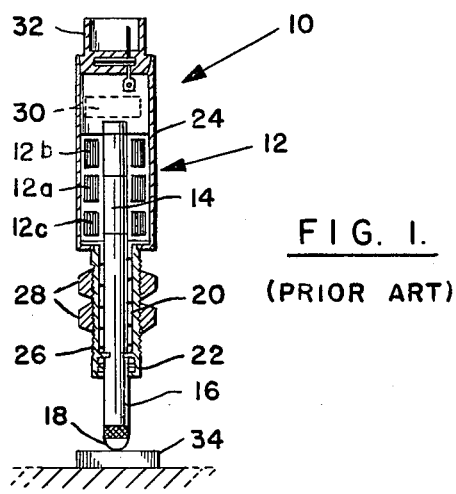
FIG. 1 is a schematic cross sectional view of the aforementioned prior art Schaevitz contacting LVDT displacement transducer.

The prior art Schaevitz LVDT displacement transducer or gage head illustrated at 10 in FIG. 1 of the drawings consists of a linear variable differential transformer (LVDT) assembly indicated at 12 having a movable core 14 that is connected to a non-rotating probe shaft or rod 16. Probe shaft 16 has a removable tip 18 and is loaded by an internal helical spring 20. Tip 18 is provided with a threaded stud (not shown) that screws into the end of shaft 16, the shaft 16 being guided in a low friction sleeve bearing 22 that is retained in a case 24. The case 24 is threaded externally at 26 and is provided with hex nuts 28 to facilitate mounting of the gage head 10 in a fixture (not shown) for on-line gaging.

Integral hybrid thick film circuitry indicated in dotted outline at 30 is contained within the case 24 for amplifying and applying the output of the LVDT assembly 12 by means of a connector 32 to a suitable readout device (not shown). A workpiece indicated at 34 may comprise any of many diverse materials. Helical spring 20 urges contact tip 18 into engagement with the surface of workpiece 34.

The LVDT assembly 12 is an electro-mechanical transducer that produces an electrical output that is proportional to the displacement of the movable core 14 with respect to three coils 12a, 12b and 12c that are equally spaced on a cylindrical coil form (not shown). Movable core 14 is rod-shaped, is positioned axially inside the coil assembly 12a, 12b and 12b, and provides a path for magnetic flux linking the coils 12a, 12b and 12c.

When the primary or center coil 12a is energized with alternating current, voltages are induced in the two outer coils 12b and 12c. When the core 14 in the center position, the output is zero. This is referred to as the null position. When the core 14 is moved from the null position, the voltage induced increases in the coil 12b or 12c toward which the core 14 is moved while the voltage induced decreases in the other coil. This produces a differential voltage output which varies linearly with changes in position of core 14. Motion of the core 14 in the opposite direction beyond the null position produces a similar linear voltage characteristic but with the phase shifted 180 degrees.

Figure 2:
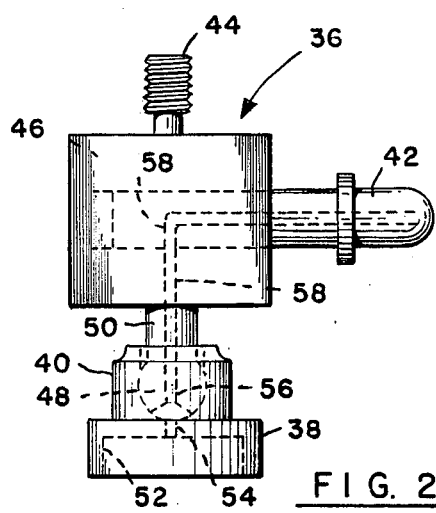
FIG. 2 is a greatly enlarged view in elevation of the novel air-bearing pad of the present invention showing the swivel mounting means.
Figure 6:
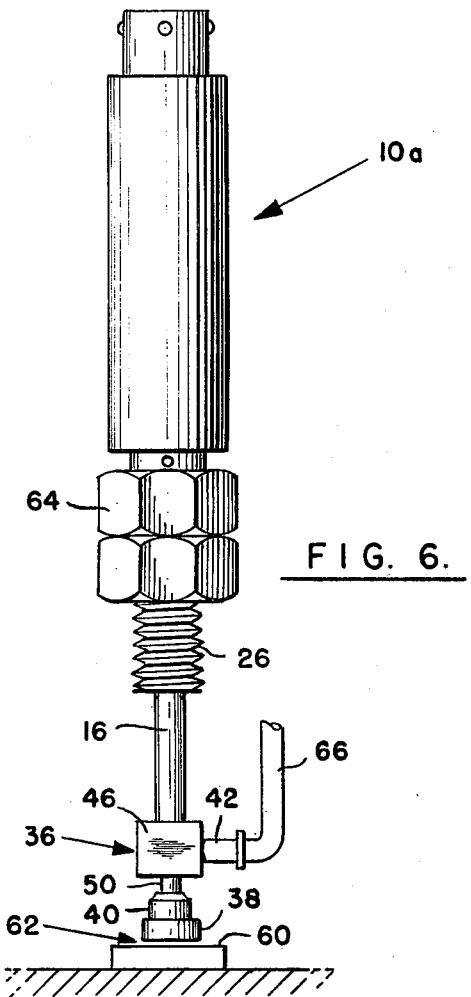
FIG. 6 is a view in elevation showing the air-bearing pad of FIG. 2 attached to and replacing the contact point or tip of a prior art gage head such as that shown in FIG. 1.
Figure 3:
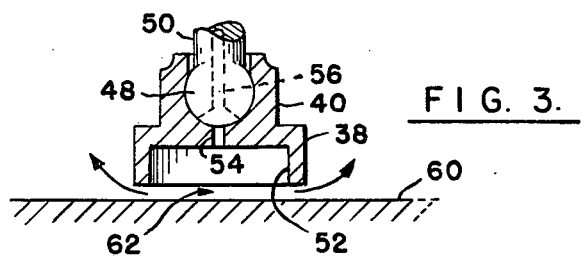
FIG. 3 is a fragmentary cross sectional view of the air bearing pad of FIG. 2.
Figure 4:
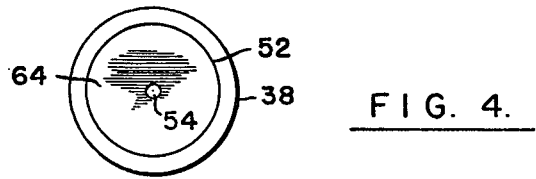
FIG. 4 is a bottom plan view of the air-bearing pad of FIG. 2.

In FIGS. 2-4 there are shown greatly enlarged views of the novel air-bearing gage tip of the present invention. The air-bearing gage tip indicated at 36, includes a short cylindrical sensing pad 38 having sharp edges, a ball and socket swivel mount 40, and an integral air fitting 42. A threaded stud 44 that is rigid with a body or support element 46 of gage tip 36 is provided for attaching the tip 36 to the end of the probe shaft 16, for example, of a gage head such as that illustrated in FIG. 1 as a replacement for the contact point 18, as illustrated in FIG. 6. A ball 48 included in the socket swivel mount 40, as shown in dotted lines in FIG. 2 and in sectional view in FIG. 3, is rigidly attached by a stem 50 to the body 46. Sensing pad 38 is provided with a recess 52 formed therein. A conduit 54 in pad 38, a conduit 56 in ball 48 and stem 50, and a conduit 58 in body 46 provide a fluid or air connection between the recess 52 in pad 38 and the air fitting 42.

The swivel mount 40 preferably is a low friction tight fitting swivel. The swivel mount is provided to accommodate workpiece surfaces being gaged, such as that indicated at 60 in FIG. 3, that approach the air-bearing device 36 at an angle, and to accommodate, also, small errors in mounting of the device 36 normal to the surface 60. A further and important feature of the swivel mount 40 for the air-bearing gage tip 36 is that the device 36 will accept small, imperfect, perturbations in surface 60 without spilling or loss of air and an associated change in the air gap. By spilling or loss of air is meant that the pressure area under the bearing pad 38 might suddenly be vented to atmosphere with an accompanying drop in pressure, resulting in a reduction of the air gap 62 to zero and contact of the bearing pad 38 with the work surface 60.

Figure 5:
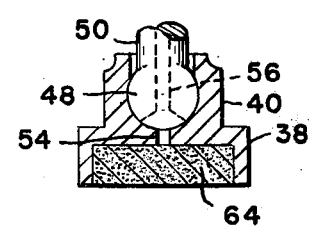
FIG. 5 is a fragmentary cross-sectional view showing a modified air-bearing pad.

While the air-bearing pad 38 may be used without a porous media in the recessed volume 52, the use of a porous media such as that indicated at 64 in FIG. 5, provides a more controlled air or other fluid flow and constant support for the pad 38. Additionally, the pad 38 is then less susceptible to fissures in the surface 60 being gaged. By the use of the porous media 64, there is provided a great number of tiny air-bearing pressure areas rather than a single small high velocity column as in nozzle sensing orifices of prior art non-contacting gage heads. The type of material employed for the porous media 64, for example, sintered bronze or stainless steel, is governed only by the cost and the environment in which the air-bearing pad 36 is to be used. Other porous materials for medium 64 may be employed, even grades of graphite.

Due to orifices that are used, the mechanical response or speed of measurement of the prior art non-contacting gages is extremely low, being approximately 1–5 hertz (hz) or cycles per second. The speed of response of a gage head employing the air-bearing gage tip 36 of the present invention is significantly more rapid being a minimum of 30 hz depending on the variance to about 50 hz. The gage head also is more accurate, the air-bearing pad 38 closely following the surface 60 without touching it. The incorporation of the ball and socket swivel 40 allows the air-bearing pad 38 to conform to the uneven portions of surface 60, accommodating undulations and perturbations thereat without spilling or loss of air. It is noted, in this connection, that the small target size of the nozzle stream or column in the prior non-contacting gage heads is susceptible to small perturbations or cracks in the surface of the material being gaged.

In FIG. 6 there is illustrated the attachment of the novel air-bearing gage tip 36 of the present invention to the end of the probe shaft 16 of a gage head 10a which may be identical, except as explained hereinafter, to the prior art gage head of FIG. 1, the air-bearing tip 36 being substituted for the contact tip 18 of FIG. 1, the threaded stud 44 being screwed into the end of probe shaft 16. As shown, supply air pressure is connected to the fitting 42 of air-bearing tip 36 by a conduit 66, a pressure regulator (not shown) being provided, if necessary, to establish the air supply pressure at a suitable value.

The size of the air gap 62 in an operative embodiment of the invention is a function of the air-bearing size and of flow, viscosity, and pressure of the air or other fluid medium employed. Typically, for many application, using air as the lubricant and nominal pressures, the air gap may be in the range from 0.002–0.004 inches (0.00512–0.01024 cm.).

It is noted that depending upon size, the air-bearing tip 36 is capable of supporting thousands of pounds in relatively friction free manner. The maximum load that can be supported can be determined from the relationship $$W = \frac{Po \, \pi \, (R^2 - Ro^2)}{2 \ln (R/Ro)}$$

where
W = load
Po = Pressure
R = Radius of outer edge of bearing
Ro = Radius of recess 52
ln = Is the logarithm to the base n.

The relationship of change in the air gap versus change in load on the bearing is referred to as bearing stiffness. Stiffness is a determinant of the mechanical response of the gage and is expressed in pounds per square inch. For example, if ten pounds per square inch were placed on the bearing and decreased the air gap by 0.001 inch (0.00254 cm.), the stiffness would be 10 pounds/0.001 inch = 10,000 pounds per square inch. The ultimately desired stiffness for the best mechanical response is a value approaching infinity where gaging is involved.

By increasing the bearing stiffness, as by increasing the load on the air-bearing by the use of a heavier spring 20a for the spring 20 as used in FIG. 1, the mechanical response of the FIG. 6 gage may be increased. It is known that if the surface of a workpiece is oscillating up and down, for a given spring, a probe which is forced against the workpiece surface by the spring will maintain contact. If, however, the frequency of such surface oscillation increases a point is reached at which the probe will be thrown clear of the surface and tend to float out of contact with the surface. In order to maintain the desired contact, the mass of the probe or the force of the spring must be increased. Where the surface oscillation is up and down, that is toward and away from the probe, increasing the spring force provides an easy solution. Where, however, the surface oscillations comprise movements transverse to the probe, increased spring force tends to result in high friction and wear of the probe and the surface.

The air-bearing gage tip of the present invention is characterized by its ability to achieve a bearing stiffness of approximately 33,000 pounds per square inch. This affords an ability If using a heavier spring 20a even where the surface oscillations are transverse of the air-bearing pad, thereby increasing the overall mechanical response of the gage and avoiding the undesired result encountered in the prior art of high friction and wear. Additionally, due to the increased bearing stiffness that is achieved when the air-bearing tip 36 is employed there is minimized the undesirable effects encountered in the prior art devices of thermal shifts in "zero" upon turning on of the air supply and cooling of the gage head and of inherent hysteresis due to friction of the seals that are provided in association with the movable components.

Thus, there has been provided according to the present invention an improved air-bearing gage tip that closely follows the surface of a non-porous material being gaged without touching it and which is effective to accommodate undulating surfaces which approach the device at an angle and which accommodates, also small errors in mounting of the device normal to the surface being gaged. The device additionally, accepts small, imperfect, surface perturbations without loss of air and the associated change in air gap. The air-bearing tip further features advantages in respect of providing a significant increase in bearing stiffness and concomitant increase in mechanical response of the gage head, and improvement in freedom from adverse effects encountered in the prior art and tending to be caused by thermal shifts, and inherent hysteresis.

What is claimed is:

1. A non-contacting gage tip for a gage head comprising:
 a cylindrical air-bearing sensing pad having sharp edges with a recess formed with sharp edges therein and including a porous material,
 said porous material filling said recess,
 swivel mounting means for attaching said air-bearing sensing pad to a gage head, and air fitting means mounted on said swivel mounting means for receiving a source of air wherein the sharp edges contribute to the operation of the air-bearing sensing pad in accepting small, imperfect, perturbations in the surface under measurement without spilling or loss of air and an associated change in the air gap.

2. A non-contacting gage tip as specified in claim 1, wherein said porous material is sintered bronze.

3. A non-contacting gage tip as specified in claim 1, wherein said porous material is stainless steel.

4. A non-contacting gage tip as specified in claim 1, wherein said porous material is graphite.

5. Apparatus for gaging rapidly moving relatively smooth surfaces comprising:

a gage head having a probe shaft, a gage tip disposed on the end of the probe shaft, spring means urging the probe shaft and gage tip toward a material surface to be gaged, and means for measuring probe shaft displacement, said gage tip including a cylindrical air-bearing sensing pad, said air-bearing pad having sharp edges with a recess formed with sharp edges therein, a porous material filling said recess providing a number of tiny air-bearing pressure areas, swivel-mounted means for attaching said sensing pad to a gage head, said swivel mounting means including a hollow ball and socket, a hollow stem connecting said ball to a body element, air fitting means mounted on said swivel mounting means for receiving a source of air, said air fitting means being mounted on said body element, and conduit means attaching said hollow stem to said fitting means for permitting passage of air from said fitting means through said stem to said ball and socket and to said sensing pad, said socket being formed in said air-bearing pad wherein the sharp edges contribute to the operation of the air-bearing sensing pad in accepting small, imperfect, perturbations in the surface under measurement without spilling or loss of air and an associated change in the air gap.

* * * * *